United States Patent
Kimoto et al.

(10) Patent No.: US 11,124,731 B2
(45) Date of Patent: Sep. 21, 2021

(54) LUBRICANT COMPOSITION AND LUBRICATING SYSTEM

(71) Applicant: DAICEL CORPORATION, Osaka (JP)

(72) Inventors: Norihiro Kimoto, Himeji (JP); Tomohiro Goto, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 16/494,584

(22) PCT Filed: Apr. 3, 2018

(86) PCT No.: PCT/JP2018/014225
§ 371 (c)(1),
(2) Date: Sep. 16, 2019

(87) PCT Pub. No.: WO2018/186381
PCT Pub. Date: Oct. 11, 2018

(65) Prior Publication Data
US 2020/0087594 A1  Mar. 19, 2020

(30) Foreign Application Priority Data

Apr. 5, 2017 (JP) .............................. JP2017-075226

(51) Int. Cl.
*C10M 169/04* (2006.01)
*C10M 105/14* (2006.01)
(Continued)

(52) U.S. Cl.
CPC ........ *C10M 169/04* (2013.01); *C10M 105/14* (2013.01); *C10M 125/02* (2013.01);
(Continued)

(58) Field of Classification Search
CPC .............. C10M 169/04; C10M 105/14; C10M 173/02; C10M 125/02; C10M 2201/041;
(Continued)

(56) References Cited

U.S. PATENT DOCUMENTS

| | | | |
|---|---|---|---|
| 6,695,974 | B2 | 2/2004 | Withers et al. |
| 2002/0100578 | A1 | 8/2002 | Withers et al. |

(Continued)

FOREIGN PATENT DOCUMENTS

| | | |
|---|---|---|
| JP | 5-51588 A | 3/1993 |
| JP | 2001-146599 A | 5/2001 |

(Continued)

OTHER PUBLICATIONS

Liu et al., Tribological properties of nanodiamonds in aqueous suspensions: effect of the surface charge, RSC Advances, Issue 96, 2015.*

(Continued)

*Primary Examiner* — Vishal V Vasisth
(74) *Attorney, Agent, or Firm* — Birch, Stewart, Kolasch & Birch, LLP.

(57) ABSTRACT

The present invention provides a lubricant composition suitable for reducing friction between sliding members such as those within a pump for circulating a heat medium of a heat pump device, and a lubricating system using the composition as a heat medium. A lubricant composition 10 of the present invention comprises: an antifreeze liquid 11 containing ethylene glycol; and 0.01 mass % or less of nanodiamond particles 12. The nanodiamond particles 12 are preferably detonation nanodiamond particles. The lubricant composition 10 is preferably a liquid composition for a heat pump. In addition, the lubricating system of the present invention uses the lubricant composition 10 as a heat medium.

15 Claims, 7 Drawing Sheets

(51) Int. Cl.
  *C10M 125/02* (2006.01)
  *C10M 173/02* (2006.01)
  *C10N 20/06* (2006.01)
  *C10N 40/30* (2006.01)

(52) U.S. Cl.
  CPC .... *C10M 173/02* (2013.01); *C10M 2201/041* (2013.01); *C10M 2207/0225* (2013.01); *C10N 2020/06* (2013.01); *C10N 2040/30* (2013.01)

(58) Field of Classification Search
  CPC ....... C10M 2207/0225; C10N 2040/30; C10N 2020/06
  See application file for complete search history.

(56) References Cited

U.S. PATENT DOCUMENTS

| | | | | |
|---|---|---|---|---|
| 2008/0248979 | A1* | 10/2008 | Nakagawa | C10M 169/04 508/128 |
| 2011/0003721 | A1* | 1/2011 | Hong | B82Y 30/00 508/113 |
| 2011/0172132 | A1 | 7/2011 | Branson et al. | |

FOREIGN PATENT DOCUMENTS

| | | |
|---|---|---|
| JP | 2004-85108 A | 3/2004 |
| JP | 2004-538349 A | 12/2004 |
| JP | 2013-538274 A | 10/2013 |
| JP | 2014-190557 A | 10/2014 |

OTHER PUBLICATIONS

English translation of the International Preliminary Report on Patentability and Written Opinion of the International Searching Authority, dated Oct. 17, 2019, for International Application No. PCT/JP2018/014225.
English translation of the International Search Report, dated May 1, 2018, for International Application No. PCT/JP2018/014225.
Extended European Search Report dated Nov. 13, 2020, in European Patent Application No. 18781441.3.
Office Action issued in Chinese Patent Application No. 201880018382.7 dated Aug. 4, 2021.
Yu et al., "Experimental investigation on the thermal transport properties of ethylene glycol based nanofluids containing low volume concentration diamond nanoparticles", Colloids and Surfaces A: Physicochem. Eng. Aspects 380, 2011, pp. 1-5.

* cited by examiner

LUBRICANT COMPOSITION AND LUBRICATING SYSTEM

TECHNICAL FIELD

The present invention relates to a lubricant composition that can be used as a heat medium for a heat pump device and the like, and to a lubricating system that uses the lubricant composition as a heat medium. The present application claims priority from a 371 of PCT/JP2018/014225, filed Apr. 3, 2018 and from JP 2017-075226 A filed in Japan on Apr. 5, 2017, the content of which is incorporated herein.

BACKGROUND ART

In recent years, heat pump devices have been used in a variety of fields. Examples of commonly used heat pump devices include refrigerators and freezers, air conditioners, and heat pump type water heaters. A heat pump is a technique that uses a heat medium to exchange heat, and a heat pump device is a device that combines a mechanism such as a compressor or expansion valve that compresses or expands the heat medium, and a mechanism such as a condenser or an evaporator for carrying out heat exchange. In such heat pump devices, such as an antifreeze liquid, which is an aqueous solution of ethylene glycol, is used as the heat medium. Such a heat pump device is described, for example, in the Patent Document 1 mentioned below.

In the interior of a pump or the like configure to circulate the heat medium of the heat pump device, a sliding part is present in a bearing unit of a piston mechanism and the like, and energy loss due to friction between sliding members, which are constituent materials of the sliding part, is a concern. In the heat medium, lubrication is required to reduce energy loss due to friction.

CITATION LIST

Patent Document

Patent Document 1: JP 2014-190557 A

SUMMARY OF INVENTION

Technical Problem

The present invention was conceived based on circumstances like those described above, and an object of the present invention is to provide a lubricant composition suitable for reducing friction between sliding members such as those within a pump configured to circulate a heat medium of a heat pump device, and a lubricating system using the composition.

Solution to Problem

According to a first aspect of the present invention, a lubricant composition is provided. The lubricant composition contains: an antifreeze liquid containing ethylene glycol; and 0.01 mass % or less of nanodiamond particles (which, hereinafter, may be referred to as "ND particles"). When the inventors used an antifreeze liquid containing ethylene glycol and studied the coefficient of friction between prescribed sliding members, the inventors discovered that the coefficient of friction is significantly reduced by adding a predetermined compounding amount of ND particles to the antifreeze liquid. This is exemplified as shown in the examples below. The reason for the significant reduction in coefficient of friction is attributed to formation of a surface having both smoothness and wettability through a tribochemical reaction in a system in which ND particles are present on the sliding member. The aspect of the present invention suitably achieves, for example, low friction between sliding members through formation of a surface suitable for friction and improvement of the wettability of the friction surface, between sliding members such as, for example, those in a pump or the like configured to circulate a heat medium of a heat pump device. The aspect of the present invention is suitable for efficiently achieving low friction while suppressing the compounded amount of the ND particles to be blended. Suppressing the compounded amount of ND particles is particularly preferable from the perspective of suppressing the cost to produce the lubricant composition.

In the present invention, the nanodiamond particles are preferably detonation nanodiamond particles. With the detonation method, ND having a particle size of primary particles of 10 nm or smaller can be appropriately produced.

In the aspect of the present invention, the lubricant composition is preferably a liquid composition for a heat pump. The lubricant composition according to an aspect of the present invention is suitable as a lubricant in a heat medium for a heat pump device.

According to a second aspect of the present invention, a lubricating system is provided. The lubricating system that is provided uses the lubricant composition as a heat medium. A lubricating system with such a configuration is suitable for achieving a low level of friction in the lubrication of diamond-like carbon (DLC) sliding members.

DESCRIPTION OF EMBODIMENTS

Figure 1:
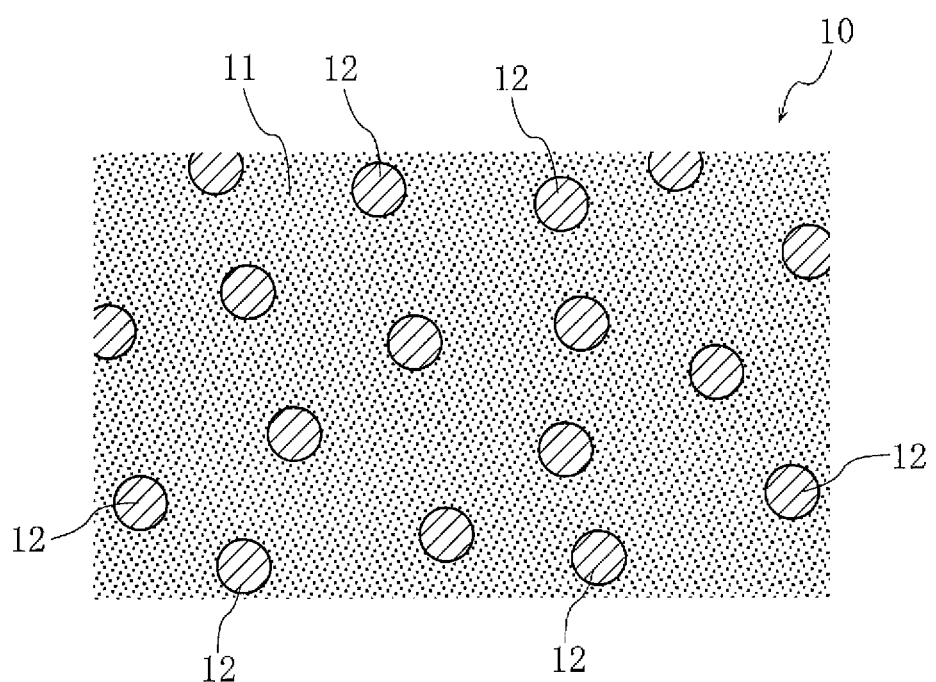
FIG. 1 is an enlarged schematic view of a lubricant composition according to one embodiment of the present invention.
Figure 2:
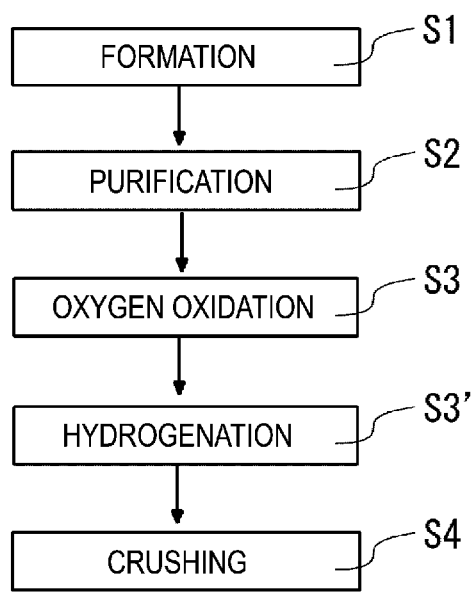
FIG. 2 is a flowchart of an example of a method for producing an ND dispersion according to one embodiment of the present invention.

FIG. 1 is an enlarged schematic view of a lubricant composition 10 according to one embodiment of the present invention. The lubricant composition 10 contains: an antifreeze liquid 11 containing ethylene glycol; ND particles 12; and other optional components that are added as necessary.

The antifreeze liquid 11 in the lubricant composition 10 is a component that contains ethylene glycol and functions as a heat medium (refrigerant) circulating in a heat pump, and therefore in the present embodiment, the content percentage of the antifreeze liquid 11 in the lubricant composition 10 is, for example, not less than 90 mass %, and preferably not less than 99 mass %.

In the present embodiment, the content percentage or concentration of ND particles 12 in the lubricant composition 10 is 0.01 mass % (100 ppm by mass) or less, preferably from 0.0001 to 0.008 mass % (from 1 to 80 ppm by mass), more preferably from 0.0003 to 0.006 mass % (from 3 to 60 ppm by mass), more preferably from 0.0005 to 0.003 mass % (from 5 to 30 ppm by mass), and more preferably from 0.0008 to 0.002 mass % (from 8 to 20 ppm by mass).

The antifreeze liquid 11 is not particularly limited as long as it contains ethylene glycol, and examples thereof include an ethylene glycol aqueous solution defined in JIS-2234. In addition to ethylene glycol, the antifreeze liquid 11 may also include, for example, propylene glycol, diethylene glycol, and alcohol (e.g., methanol, ethanol, and isopropanol).

In the present embodiment, the content percentage of ethylene glycol in the antifreeze liquid 11 is, for example, from 10 to 90 mass %, preferably from 20 to 80 mass %, and more preferably from 25 to 60 mass %. In addition, in the present embodiment, the content percentage of water in the antifreeze liquid 11 is, for example, from 10 to 90 mass %, preferably from 20 to 80 mass %, and more preferably from 40 to 75 mass %. Among these, an ethylene glycol aqueous solution containing from 25 to 60 mass % of ethylene glycol and from 40 to 75 mass % of water is particularly preferable as the antifreeze liquid 11.

The ND particles 12 contained in the lubricant composition 10 are dispersed as primary particles separated from each other in the lubricant composition 10. The term primary particles of nanodiamond refers to nanodiamonds having a particle size of 10 nm or smaller. The lower limit of the particle size of the primary particles of the nanodiamonds is for example 1 nm. Moreover, the D50 (median diameter) particle size of the ND particles 12 in the lubricant composition 10 is, for example, 9 nm or smaller, preferably 8 nm or smaller, more preferably 7 nm or smaller, and even more preferably 6 nm or smaller. The D50 particle size of the ND particles 12 can be measured, for example, by the dynamic light scattering method.

The ND particles 12 contained in the lubricant composition 10 are preferably detonation ND particles (ND particles produced by the detonation method). With the detonation method, ND having a particle size of primary particles of 10 nm or smaller can be appropriately produced.

The lubricant composition is preferably a liquid composition for a heat pump. The lubricant composition according to an aspect of the present invention is suitable as a lubricant in a heat medium for a heat pump device.

The so-called zeta potential of the ND particles 12 contained in the lubricant composition 10 may be negative or positive. When the value of the zeta potential is negative, then the value is from −50 to −30 mV, for example. For example, employing a relatively high temperature (for example, from 400 to 450° C.) for the temperature conditions of the oxygen oxidation treatment in the production process, described below, may bring the zeta potential of the ND particles 12 to a negative value. When the value of the zeta potential is positive, then the value is from 30 to 50 mV, for example. For example, in the production process, performing a hydrogenation step after an oxygen oxidation step as described below may bring the zeta potential of the ND particles 12 to a positive value.

The lubricant composition 10 may contain other components in addition to the ND particles 12 and antifreeze liquid 11 containing ethylene glycol as described above. Examples of other components include surfactants, thickeners, coupling agents, anti-rust agents for preventing rust of the metal members that are members to be lubricated, corrosion inhibitors for inhibiting corrosion of non-metal members that are members to be lubricated, freezing point depression agents, antifoaming agents, anti-wear additives, antiseptics, colorants, and solid lubricants other than the ND particles 12.

The lubricant composition 10 as described above can be produced by mixing the ND dispersion obtained by a method described below and desired components such as ethylene glycol and water. The ND dispersion can be produced, for example, via a process that includes at least formation S1, purification S2, oxygen oxidation S3, and crushing S4.

In the formation S1, nanodiamonds are produced, for example, by a detonation method. More specifically, first, an electric detonator is attached to a molded explosive and then placed inside a pressure-resistant container for detonation, and the container is sealed in a state in which a predetermined gas and the explosive to be used coexist inside the container. The container is made of iron for example, and the volume of the container is, for example, from 0.5 to 40 m$^3$. A mixture of trinitrotoluene (TNT) and cyclotrimethylenetrinitramine, which is also known as hexogen (RDX), can be used as the explosive. The mass ratio (TNT/RDX) of TNT and RDX is, for example, in a range from 40/60 to 60/40. The usage amount of the explosive is, for example, from 0.05 to 2.0 kg. The gas that is sealed in the container along with the explosive that is used may have an atmospheric composition or may be an inert gas. From the viewpoint of forming nanodiamonds with few functional groups on the surface of the primary particles, the gas sealed inside the container along with the explosive that is used is preferably an inert gas. That is, from the viewpoint of forming nanodiamonds with few of functional groups on the surface of the primary particles, the detonation method for forming nanodiamonds is preferably performed in an inert gas atmosphere. As the inert gas, for example, at least one selected from nitrogen, argon, carbon dioxide, and helium can be used.

In the formation S1, the electric detonator is ignited, and the explosive is detonated in the container. "Detonation" refers to, among explosive reactions associated with chemical reactions, one that includes a flame surface where the reaction occurs traveling at a high speed exceeding the speed of sound. During the detonation, the explosive that is used undergoes partially incomplete combustion and releases carbon, the carbon thereof is used as a raw material, and nanodiamonds are produced by the action of the pressure and energy of the shock waves that are produced in the explosion. According to the detonation method, as described above, nanodiamonds having a primary particle size of 10 nm or smaller can be appropriately generated. In the formation of the nanodiamonds, first the product obtained through the detonation method is subjected to Coulomb interaction between crystal planes, in addition to Van der Walls forces between adjacent primary particles or crystallites, and as a result, the product very strongly aggregates to form aggregates.

In the formation S1, next, the container and its interior are left standing for 24 hours, for example, at room temperature, and thereby allowed to cool. After this cooling, the nanodiamond crude product is collected. The nanodiamond crude product can be recovered, for example, by scraping with a spatula the nanodiamond crude product (including soot and the nanodiamond aggregates produced as described above)

deposited on the inner wall of the container. Crude product of nanodiamond particles can be obtained through a detonation method like that described above. Furthermore, the desired amount of the nanodiamond crude product can be obtained by performing the formation S1 as described above a necessary number of times.

In the present embodiment, the purification S2 includes an acid treatment in which a strong acid is allowed to act on the raw nanodiamond crude product in an aqueous solvent, for example. The nanodiamond crude product obtained by the detonation method is prone to inclusion of metal oxide, and this metal oxide is an oxide of metals such as Fe, Co, or Ni derived from the container or the like used in the detonation method. The metal oxide can be dissolved and removed from the nanodiamond crude product by allowing a predetermined strong acid to act thereon (acid treatment) in an aqueous solvent, for example. The strong acid used in the acid treatment is preferably a mineral acid, and examples thereof include hydrochloric acid, hydrofluoric acid, sulfuric acid, nitric acid, and aqua regia. In the acid treatment, one type of strong acid may be used alone, or two or more types of strong acids may be used in combination. The concentration of the strong acid used in the acid treatment is, for example, from 1 to 50 mass %. The acid treatment temperature is from 70 to 150° C., for example. The duration of the acid treatment is, for example, from 0.1 to 24 hours. Furthermore, the acid treatment can be performed under reduced pressure, at atmospheric pressure, or under pressurization. After such acid treatment, the solid content (including nanodiamond aggregates) is washed with water by decantation, for example. Washing of the solid content by decantation is preferably repeated until the pH of the precipitate solution reaches 2 to 3, for example. In a case where the content amount of metal oxide in the nanodiamond crude product obtained by the detonation method is small, the acid treatment such as that described above may be omitted.

In the present embodiment, the purification S2 includes a solution oxidation treatment for removing non-diamond carbon such as graphite or amorphous carbon from the nanodiamond crude product (nanodiamond aggregates prior to completion of purification) using an oxidizing agent. The nanodiamond crude product obtained by the detonation method contains non-diamond carbon such as graphite or amorphous carbon, and this non-diamond carbon is derived from carbon that did not form nanodiamond crystals from amongst the carbon that was released when the explosive that was used underwent partially incomplete combustion. For example, the non-diamond carbon can be removed from the nanodiamond crude product by, for example, a solution oxidation treatment in which a predetermined oxidizing agent is allowed to act thereon in an aqueous solvent after the acid treatment described above. Examples of the oxidizing agent used in the solution oxidation treatment include chromic acid, chromic anhydride, dichromic acid, permanganic acid, perchloric acid, and salts thereof, nitric acid, and mixed acids (mixture of sulfuric acid and nitric acid). In the solution oxidation treatment, one type of oxidizing agent may be used alone, or two or more types of oxidizing agents may be used in combination. The concentration of the oxidizing agent used in the solution oxidation treatment is, for example, from 3 to 50 mass %. The amount of the oxidizing agent used in the solution oxidation treatment is, for example, from 300 to 2000 parts by mass per 100 parts by mass of the nanodiamond crude product that is subjected to solution oxidation treatment. The solution oxidation treatment temperature is, for example, from 50 to 250° C. The duration for solution oxidation treatment is, for example, from 1 to 72 hours. The solution oxidation treatment can be performed under reduced pressure, at atmospheric pressure, or under pressurization. After such solution oxidation treatment, the solid content (including nanodiamond aggregates) is washed with water by decantation, for example. When the initial supernatant liquid from the water washing is colored, it is preferable to repeat the washing of the solid content by decantation until the supernatant liquid becomes visually clear.

Even after undergoing an acid treatment and solution oxidation treatment as described above, the detonation nanodiamonds take on the form of aggregates (secondary particles) in which the primary particles interact very strongly with each other and aggregate. In order to facilitate separation of primary particles from these aggregates, in the present embodiment, next, a predetermined alkali and hydrogen peroxide may be allowed to act on the nanodiamonds in an aqueous solvent. Through this, for example, when metal oxide that was not removed by the acid treatment described above remains in the nanodiamonds, that metal oxide can be removed, and separation of the nanodiamond primary particles from the nanodiamond aggregates is facilitated (alkali-hydrogen peroxide treatment). Examples of the alkali used in this treatment include sodium hydroxide, ammonia, and potassium hydroxide. In this treatment, the concentration of the alkali is, for example, from 0.1 to 10 mass %, the concentration of hydrogen peroxide is, for example, from 1 to 15 mass %, the treatment temperature is, for example, from 40 to 100° C., and the duration for the treatment is, for example, from 0.5 to 5 hours. Furthermore, the present treatment can be performed under reduced pressure, at atmospheric pressure, or under pressurization. After the supernatant is removed by decantation, for example, from the nanodiamond-containing solution that was subjected to this treatment, the residual fraction is subjected to a drying treatment to obtain a dry powder. Examples of the drying treatment include spray drying performed using a spray drying apparatus or evaporating to dryness using an evaporator.

In the next oxygen oxidation S3, the nanodiamond powder that was subjected to the purification S2 is heated in an atmosphere of gas of a prescribed composition containing oxygen using a gas atmosphere furnace. Specifically, the nanodiamond powder is inserted into the gas atmosphere furnace, an oxygen-containing gas is fed into or passed through the furnace, the inside of the furnace is heated to a temperature condition set as the heating temperature, and the oxygen oxidation treatment is performed. The temperature condition of this oxygen oxidation treatment is, for example, from 250 to 500° C. To achieve a negative zeta potential for the ND particles contained in the ND dispersion to be produced, the temperature of this oxygen oxidation treatment is preferably relatively high, namely from 400 to 450° C., for example. Additionally, the oxygen-containing gas used in the present embodiment is a mixed gas containing an inert gas in addition to oxygen. Examples of the inert gas include nitrogen, argon, carbon dioxide, and helium. The oxygen concentration of the mixed gas is, for example, from 1 to 35 vol. %.

To achieve a positive zeta potential for the ND particles contained in the ND dispersion to be produced, a hydrogenation S3' is preferably performed after the oxygen oxidation S3 described above. In the hydrogenation S3', the nanodiamond powder that was subjected to the oxygen oxidation S3 is heated using a gas atmosphere furnace, in an atmosphere of gas of a prescribed composition containing hydrogen. Specifically, a hydrogen-containing gas is fed into or passed through the gas atmosphere furnace, in which the nanodiamond powder is placed, the inside of the furnace is heated to a temperature condition set as the heating temperature, and the hydrogenation treatment is performed. The temperature condition of this hydrogenation treatment is, for example, from 400 to 800° C. Furthermore, the hydrogen-containing gas that is used in the present embodiment is a mixed gas containing an inert gas in addition to hydrogen. Examples of the inert gas include nitrogen, argon, carbon dioxide, and helium. The hydrogen concentration of the mixed gas is, for example, from 1 to 50 vol. %. To achieve a negative zeta potential for the ND particles contained in the ND dispersion to be produced, the following crushing S4 may be performed without performing such hydrogenation.

Even after undergoing purification, etc. in a series of processes like those described above, the detonation nanodiamonds take on the form of aggregates (secondary particles) in which the primary particles interact very strongly with each other and aggregate. The crushing S4 is performed next in order to separate the primary particles from the aggregates. Specifically, first, nanodiamonds that have undergone the oxygen oxidation S3 or subsequent hydrogenation S3' are suspended in pure water to prepare a slurry containing nanodiamonds. In preparing the slurry, centrifugation may be carried out to remove relatively large aggregates from the nanodiamond suspension, or the nanodiamond suspension may be subjected to ultrasonic treatment. The slurry is then subjected to a wet crushing treatment. The crushing treatment can be performed using, for example, a high shearing mixer, a high shear mixer, a homomixer, a ball mill, a bead mill, a high pressure homogenizer, an ultrasonic homogenizer, or a colloid mill. The crushing treatment may also be performed by combining these. From the viewpoint of efficiency, a bead mill is preferably used.

A bead mill, which is a grinding device or a disperser, is provided with, for example, a cylindrical mill container, a rotor pin, a centrifugation mechanism, a raw material tank, and a pump. The rotor pin has an axial center that is common with that of the mill container, and is configured to be rotatable at high speeds within the mill container. The centrifugation mechanism is disposed at an upper part inside the mill container. In bead milling using a bead mill in the crushing, the slurry (including nanodiamond aggregates) is charged as a raw material from the raw material tank into a lower part of the mill container by the action of the pump, in a state in which the inside of the mill container is filled with a predetermined amount of beads and the rotor pin of the bead mill is stirring the beads. The slurry passes through the beads which is under high-speed stirring in the mill container and reaches the upper part of the inside of the mill container. In this process, the nanodiamond aggregates contained in the slurry are subjected to action of grinding or dispersion through contact with the vigorously moving beads. As a result, crushing of the nanodiamond aggregates (secondary particles) into primary particles proceeds. The slurry and beads that has reached the centrifugation mechanism at the upper part in the mill container are subjected to centrifugation based on the differences in specific gravity by the centrifugation mechanism in operation. The beads remain in the mill container, and the slurry is discharged out of the mill container via a hollow line that is slidably coupled to the centrifugation mechanism. The discharged slurry is returned to the raw material tank, and then pumped back into the mill container by the action of the pump (circulation operation). In such bead milling, zirconia beads, for example, are used as the crushing media, and the diameter of the beads is, for example, from 15 to 500 μm.

The amount (apparent volume) of beads that are used to fill the mill container is, for example, from 50 to 80% based on the volume of the mill container. The circumferential speed of the rotor pin is, for example, from 8 to 12 m/minute. The amount of slurry to be circulated is, for example, from 200 to 600 mL, and the flow rate of the slurry is, for example, from 5 to 15 L/hour. Furthermore, the duration for treatment (circulation operation time) is, for example, from 30 to 300 minutes. In the present embodiment, a batch-type bead mill may be used instead of a continuous bead mill like that described above.

Through such crushing S4, an ND dispersion containing nanodiamond primary particles can be obtained. The dispersion obtained through the crushing S4 may be subjected to a classification operation to remove coarse particles. For example, a classifier can be used to remove coarse particles from the dispersion through a classification operation that uses centrifugation. This results in, for example, a black transparent ND dispersion in which primary particles of nanodiamonds are dispersed as colloidal particles.

In addition, an ND dispersion that is produced by introducing a polyglyceryl group in a surface modifying group of the ND particles by the method described in JP 2010-248023 A may be used.

The lubricant composition 10 contains ND particles 12 as described above, and thus low friction in the lubrication between the prescribed members, e.g. the friction coefficient less than 0.01, can be achieved. In addition, when the lubricant 10 is a liquid composition for a heat pump, even if the ND particle concentration is relatively low, low friction with a coefficient of friction of, for example, not greater than around 0.01 can be achieved in lubrication between diamond-like carbon (DLC) sliding members, for example. This is, for example, illustrated in the examples described below. The reason for the reduction in the coefficient of friction is attributed to the formation of a surface having both smoothness and wettability through a tribochemical reaction in a system in which the antifreeze liquid 11 and ND particles 12 of a relatively low concentration are present, the surface being formed between DLC sliding members lubricated by the liquid composition for a heat pump.

In the present embodiment, the content percentage or concentration of ND particles 12 in the lubricant composition 10 is, based on the total lubricant composition, 0.01 mass % (100 ppm by mass) or less, preferably from 0.0001 to 0.008 mass % (from 1 to 80 ppm by mass), more preferably from 0.0003 to 0.006 mass % (from 3 to 60 ppm by mass), more preferably from 0.0005 to 0.003 mass % (from 5 to 30 ppm by mass), and more preferably from 0.0008 to 0.002 mass % (from 8 to 20 ppm by mass). The lubricant composition 10 is suitable for efficiently achieving low friction while suppressing the compounded amount of ND particles 12 that are to be blended with the antifreeze liquid 11. Suppressing the compounded amount of ND particles 12 is preferable from the viewpoint of suppressing the cost to produce the lubricant composition 10.

Figure 3:
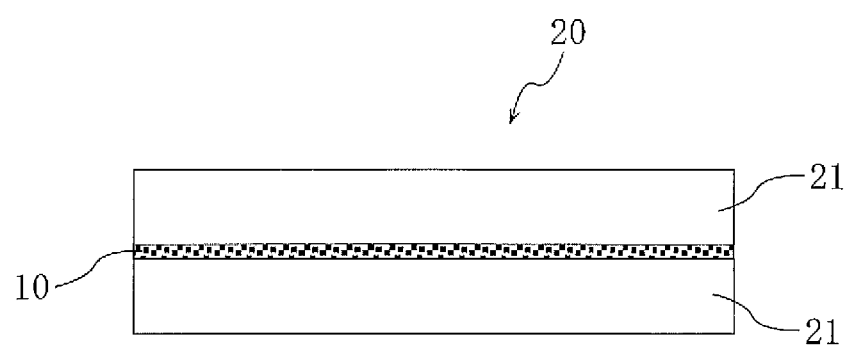
FIG. 3 is a conceptual schematic view of a lubricating system according to one embodiment of the present invention.

FIG. 3 is a conceptual schematic view of a lubricating system 20 according to one embodiment of the present invention. The lubricating system 20 uses the lubricant composition 10 as a heat medium. In FIG. 3, the lubricating system 20 includes a configuration that includes a member 21 and the lubricant composition 10. The member 21 has a sliding surface. Thin films made of a substance having carbon as a main component, the carbon having carbon-carbon bonds of both diamond and graphite, may be collectively called DLC. A member having the DLC in the sliding surface of the member is called a DLC sliding member. The lubricant composition 10 is used as a heat medium (refrigerant) in a heat pump device, but contains ND particles 12 and is also used for lubrication of the sliding surfaces of a plurality of members 21. The lubricating system 20 configured in this manner is suitable for achieving low friction between the members 21 (particularly low friction between DLC sliding members).

DLC is a substance that excels in wear resistance and slidability, and is suitably used as a coating material on members such as sliding members. The properties of DLC can be differentiated by the hydrogen content amount and by the proximity of the electron orbits of the contained crystalline material toward diamond or graphite. Examples of DLC include amorphous hydrogenated carbon a-C:H, amorphous carbon a-C, hydrogenated tetrahedral amorphous carbon ta-C:H, and hydrogenated tetrahedral amorphous carbon ta-C.

EXAMPLES

Production of Nanodiamond Aqueous Dispersion X1

A nanodiamond aqueous dispersion X1 (ND aqueous dispersion X1) was produced through the following process including formation, purification, oxygen oxidation, and crushing.

In the formation, first, an electric detonator was attached to a molded explosive, and then placed inside a pressure-resistant container for detonation, and the container was sealed. The container was made of iron, and the volume of the container was 15 $m^3$. As the explosive, 0.50 kg of a mixture of trinitrotoluene (TNT) and cyclotrimethylenetrinitramine, namely hexogen (RDX) was used. The mass ratio (TNT/RDX) of the TNT and RDX in the explosive was 50/50. Next, the electric detonator was ignited, and the explosive was detonated in the container. Subsequently, the container and its interior were left standing for 24 hours at room temperature, and were thereby cooled. After this cooling, the nanodiamond crude product deposited on the inner wall of the container (including soot and the nanodiamond aggregates produced by the detonation method described above) was collected. Next, the nanodiamond crude product obtained by performing the formation described above multiple times was subjected to an acid treatment in the purification. Specifically, a slurry obtained by adding 6 L of 10 mass % hydrochloric acid to 200 g of the nanodiamond crude product was subjected to a heating treatment for 1 hour under reflux at normal pressure conditions. The heating temperature in this acid treatment was from 85 to 100° C. Next, after cooling, the solid content (including nanodiamond aggregates and soot) was washed with water by decantation. Washing of the solid content by decantation was repeated until the pH of the precipitate solution reached 2 from the low pH side. Next, a mixed acid treatment was performed as a solution oxidation treatment of the purification. Specifically, a slurry was formed by adding 6 L of a 98 mass % sulfuric acid aqueous solution and 1 L of a 69 mass % nitric acid aqueous solution to the precipitate solution (containing nanodiamond aggregates) obtained through decantation after the acid treatment, and subsequently, the slurry was heated under reflux for 48 hours at normal pressure conditions. The heating temperature in this oxidation treatment was from 140 to 160° C. Next, after cooling, the solid content (including nanodiamond aggregates) was washed with water by decantation. The initial supernatant liquid from the water washing was colored, and therefore the washing of the solid content by decantation was repeated until the supernatant liquid became visually clear. Next, a slurry was formed by adding 1 L of a 10 mass % sodium hydroxide aqueous solution and 1 L of a 30 mass % hydrogen peroxide aqueous solution to a precipitate solution (containing nanodiamond aggregates) obtained through decantation after the solution oxidation treatment, and subsequently, the slurry was heated under reflux for 1 hour at normal pressure conditions (alkali-hydrogen peroxide treatment). The heating temperature in this treatment was from 50 to 105° C. The supernatant was then removed by decantation after cooling. Furthermore, the residual fraction after decantation was subjected to a drying treatment, and a dry powder (nanodiamond powder) was obtained. As a technique for the drying treatment, evaporation to dryness through the use of an evaporator was adopted. Next, an oxygen oxidation was performed using a gas atmosphere furnace (trade name "Gas Atmosphere Tube Furnace KTF045N1", available from Koyo Thermo Systems Co., Ltd.). Specifically, 4.5 g of the nanodiamond powder obtained as described above was left stand inside a furnace core tube of the gas atmosphere furnace, and nitrogen gas was passed continuously through the furnace core tube for 30 minutes at a flow rate of 1 L/minute, after which the circulating gas was switched from nitrogen to a mixed gas of oxygen and nitrogen, and the mixed gas was continuously passed through the furnace core tube at a flow rate of 1 L/minute. The oxygen concentration in the mixed gas was 4 vol. %. After switching to the mixed gas, the interior of the furnace was heated to 400° C., which was the temperature setting for heating. The rate of temperature increases up to 380° C., which is 20° C. lower than the heating temperature setting, was set to 10° C./minute, followed by the rate of temperature increase of 1° C./minute from 380° C. to 400° C. The oxygen oxidation treatment was then performed on the nanodiamond powder in the furnace while maintaining the temperature inside the furnace at 400° C. The duration of the treatment was 3 hours. The crushing was then performed. Specifically, first, 1.8 g of the nanodiamond powder that had passed through the oxygen oxidation, and 28.2 mL of pure water were mixed in a 50 mL sample bottle to obtain a slurry of approximately 30 mL. Next, the pH of the slurry was adjusted by adding a 1N aqueous solution of sodium hydroxide, after which the slurry was subjected to an ultrasonic treatment. In the ultrasonic treatment, the slurry was subjected to ultrasonic irradiation for 2 hours using an ultrasonic irradiator (trade name "Ultrasonic Cleaner AS-3", available from AS ONE). Subsequently, bead milling was performed using a bead milling device (trade name "Parallel 4-Tube Sand Grinder Model LSG-4U-2L", available from Aimex Co., Ltd.). Specifically, 30 mL of the slurry after ultrasonic irradiation, and zirconia beads having a diameter of 30 μm were charged in a 100 mL vessel (available from Aimex Co., Ltd.), which was the mill container and the vessel was sealed. Then, the device was operated to perform bead milling. In this bead milling, the amount of zirconia beads that were charged was approximately 33% based on the volume of the mill container, the rotational speed of the mill container was 2570 rpm, and the duration of the milling was 2 hours. Next, the slurry or suspension that had undergone this crushing was subjected to a centrifugation treatment (classification operation) using a centrifuge device. The centrifugal force in this centrifugation treatment was 20000×g, and the duration of the centrifugation was 10 minutes. Next, 10 mL of supernatant of the nanodiamond-containing solution that had been subjected to this centrifugation treatment was collected. In this way, an ND aqueous dispersion X1 having nanodiamonds dispersed in pure water was obtained. For this ND aqueous dispersion X1, the solid content concentration or nanodiamond concentration was 59.1 g/L, and the pH was 9.33.

Particle Size

The particle size distribution of the nanodiamond particles contained in the ND aqueous dispersion X1 obtained as described above was measured by dynamic light scattering. Specifically, the particle size distribution of the nanodiamonds was measured by dynamic light scattering (non-contact backscattering) using an instrument (trade name "Zetasizer Nano ZS") available from Malvern Panalytical Ltd. The ND aqueous dispersion X1 for measurements was prepared by dilution with ultrapure water to a solid content concentration or a nanodiamond concentration of 2.0 mass %, followed by ultrasonic irradiation using an ultrasonic cleaner. Based on the measurement results, the D50 (median diameter) particle size of the nanodiamond particles contained in the ND aqueous dispersion X1 was 3.97 nm, and the D90 particle size was 7.20 nm.

Zeta Potential

The zeta potential of the nanodiamond particles contained in the ND aqueous dispersion X1 obtained as described above was measured by Laser Doppler type electrophoresis using an instrument (trade name "Zetasizer Nano ZS") available from Malvern Panalytical Ltd. The ND aqueous dispersion X1 for measurements was prepared by dilution with ultrapure water to a solid content concentration or a nanodiamond concentration of 0.2 mass %, followed by ultrasonic irradiation using an ultrasonic cleaner. The pH of the ND aqueous dispersion X1 was 9. The temperature when measuring the zeta potential was 25° C. Based on the measurement results, the zeta potential was −42 mV.

Example 1

The ND aqueous dispersion X1 prepared as described above was mixed with ethylene glycol and water, and the concentration was adjusted to thereby produce a lubricant composition containing 0.01 mass % of nanodiamond particles (50% aqueous solution of ethylene glycol containing 0.01 mass % of ND particles).

Example 2

The ND aqueous dispersion X1 prepared as described above was mixed with ethylene glycol and water, and the concentration was adjusted to thereby produce a lubricant composition containing 0.001 mass % of nanodiamond particles (50% aqueous solution of ethylene glycol containing 0.001 mass % of ND particles).

Friction Test

Figure 4:
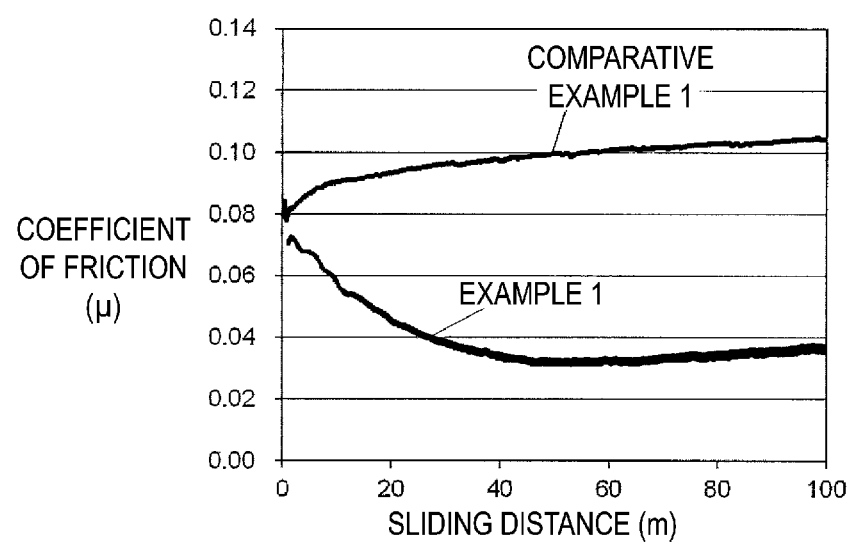
FIG. 4 is a graph illustrating the results of friction tests using the lubricant compositions of Comparative Example 1 and Example 1.
Figure 5:
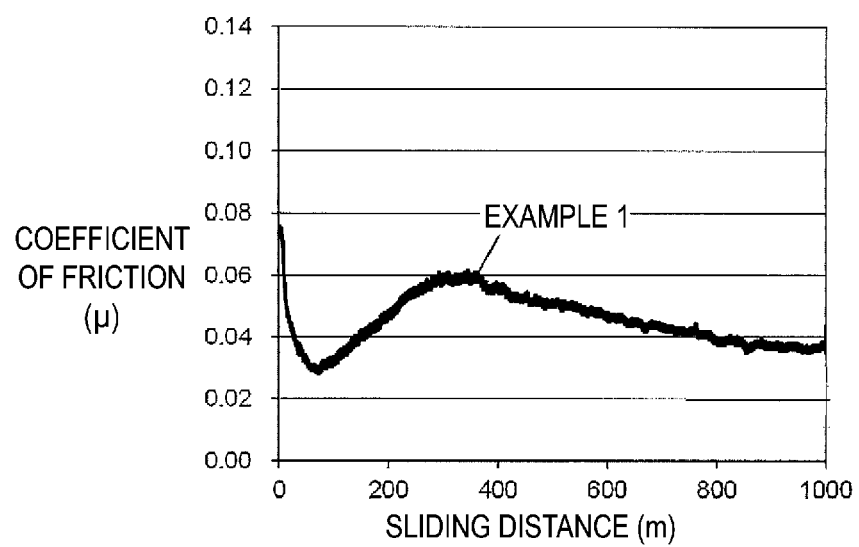
FIG. 5 is a graph illustrating the results of a friction test using the lubricant composition of Example 1.
Figure 6:
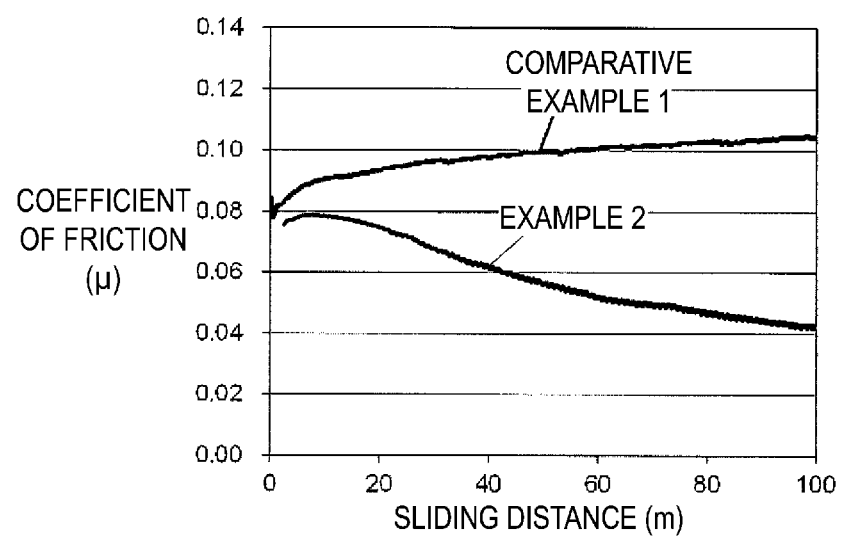
FIG. 6 is a graph illustrating the results of friction tests using the lubricant compositions of Comparative Example 1 and Example 2.
Figure 7:
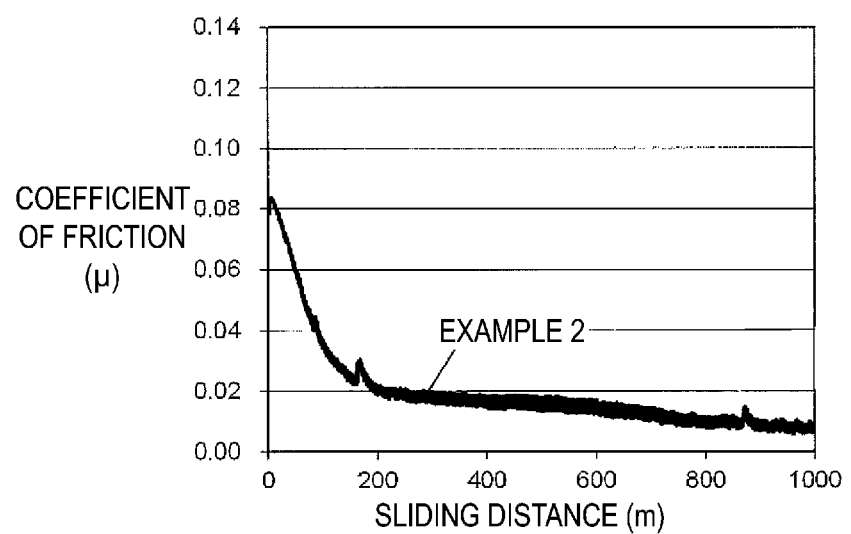
FIG. 7 is a graph illustrating the results of a friction test using the lubricant composition of Example 2.

Friction tests were conducted to examine the coefficient of friction when a 50% aqueous solution of ethylene glycol not containing particles (Comparative Example 1), the lubrication composition of the abovementioned Example 1, and the lubrication composition of the abovementioned Example 2 were each used for lubrication between a DLC coated disk substrate (diameter: 30 mm, thickness: 4 mm) made of SUJ-2 and a DLC coated ball (diameter: 8 mm) made of SUJ-2. This friction test was performed using a ball-on-disk type sliding friction tester (model number "UMT-3", available from Bruker AXK GmbH). Specifically, at the startup of the test, 1 mL of the lubricant composition was dropped onto the disk substrate surface, and the disk substrate was rotated while the ball was in contact with the disk substrate surface. Thus, the ball was allowed to slide relatively along the disk substrate surface. In this friction test, the test temperature was set to room temperature, the ball load on the disk substrate surface was set to 8 N, the sliding speed of the ball on the disk substrate surface was set to 0.15 m/second, and the sliding distance of the ball on the disk substrate surface was set to 100 m or 1000 m. FIGS. 4 and 6 are graphs of cases in which the sliding distance, which is the total sliding distance, was set to 100 m, and FIGS. 5 and 7 are graphs of cases in which with a sliding distance was set to 1000 m. The coefficient of friction ($\mu$) of Comparative Example 1 when the sliding distance was 100 m was 0.104 (see FIG. 4 or FIG. 6). The coefficient of friction ($\mu$) of Example 1 when the sliding distance was 100 m was 0.039 (see FIG. 4), and the coefficient of friction ($\mu$) of Example 1 when the sliding distance was 1000 m was 0.039 (see FIG. 5). The coefficient of friction ($\mu$) of Example 2 when the sliding distance was 100 m was 0.042 (see FIG. 6), and the coefficient of friction ($\mu$) of Example 2 when the sliding distance was 1000 m was 0.008 (see FIG. 7).

REFERENCE SIGNS LIST

10 Lubricant composition
11 Antifreeze liquid
12 ND particle
20 Lubricating system
21 Member
S1 Formation
S2 Purification
S3 Oxygen oxidation
S3' Hydrogenation
S4 Crushing As a summary of the above, the configurations of the present invention and variations thereof are described below.

[1] A lubricant composition including: an antifreeze liquid containing ethylene glycol; and 0.01 mass % or less of nanodiamond particles.

[2] The lubricant composition according to [1], wherein the nanodiamond particles are detonation nanodiamond particles.

[3] The lubricant composition according to [1] or [2], wherein a particle size (D50: median diameter) of primary particles of the nanodiamond particles is not greater than 10 nm.

[4] The lubricant composition according to any one of [1] to [3], wherein a zeta potential of the nanodiamond particles is negative (e.g., from −50 to −30 mV).

[5] The lubricant composition according to any one of [1] to [3], wherein the zeta potential of the nanodiamond particles is positive (e.g., from 30 to 50 mV).

[6] The lubricant composition according to any one of [1] to [5], wherein a content percentage of the antifreeze liquid is not less than 90 mass %.

[7] The lubricant composition according to any one of [1] to [6], wherein a content percentage of ethylene glycol in the antifreeze liquid is from 10 to 90 mass %.

[8] The lubricant composition according to any one of [1] to [7], wherein the lubricant composition is a liquid composition for a heat pump.

[9] A lubricating system which uses a lubricant composition described in any one of [1] to [8] as a heat medium.

[10] A lubricating system having a lubricant composition according to any one of [1] to [8] present between sliding surfaces of two members having said sliding surfaces.

[11] The lubricating system according to [10], wherein a material of the sliding surface is diamond-like carbon (DLC).

INDUSTRIAL APPLICABILITY

The lubricant composition of the present invention can be used as a heat medium for a heat pump device and the like. In addition, the lubricating system of the present invention uses the lubricant composition as a heat medium, and can be applied as a sliding part such as a bearing unit of a piston mechanism inside a pump or the like for circulating a heat medium of a heat pump device and the like.

The invention claimed is:

1. A lubricant composition comprising:
   an antifreeze liquid containing ethylene glycol; and
   0.0003 to 0.006 mass % of nanodiamond particles;
   wherein the zeta potential of the nanodiamond particles is from −50 to −30 mV, wherein the zeta potential is measured by Doppler electrophoresis at a measurement temperature of 25° C.

2. The lubricant composition according to claim 1, wherein the nanodiamond particles are detonation nanodiamond particles.

3. The lubricant composition according to claim 1, wherein the lubricant composition is a liquid composition for a heat pump.

4. A lubricating system which uses the lubricant composition described in claim 1 as a heat medium.

5. The lubricant composition according to claim 1, wherein a content percentage of the antifreeze liquid is 90 mass % or greater.

6. The lubricant composition according to claim 1, wherein a content percentage of ethylene glycol in the antifreeze liquid is from 10 to 90 mass %.

7. The lubricant composition according to claim 1, wherein the antifreeze liquid is an ethylene glycol aqueous solution.

8. The lubricant composition according to claim 7, wherein the ethylene glycol aqueous solution comprises from 25 to 60 mass % of ethylene glycol, and from 40 to 75 mass % of water.

9. The lubricant composition according to claim 1, wherein a D50 particle size of the nanodiamond particles in the lubricant composition is not greater than 10 nm,
   wherein the D50 particle size is measured by dynamic light scattering technique using a noncontact backscatter mode.

10. A lubricant composition according to claim 1, wherein a content percentage of the nanodiamond particles in the lubricant composition is from 0.0005 to 0.003 mass %.

11. The lubricant composition according to claim 2, wherein a D50 particle size of the nanodiamond particles in the lubricant composition is not greater than 6 nm,
    wherein the D50 particle size is measured by dynamic light scattering technique using a noncontact backscatter mode.

12. The lubricant composition according to claim 11, wherein a content percentage of the nanodiamond particles in the lubricant composition is from 0.0008 to 0.002 mass %.

13. The lubricant composition according to claim 12, wherein the ethylene glycol aqueous solution comprises from 25 to 60 mass % of ethylene glycol and from 40 to 75 mass % of water.

14. A lubricating system having the lubricant composition described in claim 1 present between sliding surfaces of two members having the sliding surfaces.

15. The lubricating system according to claim 14, wherein a material of the sliding surface is a diamond-like carbon.

* * * * *